United States Patent
Aoki

(10) Patent No.: US 9,999,937 B2
(45) Date of Patent: Jun. 19, 2018

(54) SPOT WELDING SYSTEM, METHOD AND COMPUTER PROGRAM CAPABLE OF MAKING PRESSURIZING FORCE APPLIED TO OBJECT TO BE PRESSED TO BE CONSTANT

(71) Applicant: FANUC Corporation, Yamanashi (JP)

(72) Inventor: Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 14/927,554

(22) Filed: Oct. 30, 2015

(65) Prior Publication Data

US 2016/0129525 A1   May 12, 2016

(30) Foreign Application Priority Data

Nov. 6, 2014   (JP) ................... 2014-226274

(51) Int. Cl.
  *B23K 11/11*   (2006.01)
  *B23K 11/30*   (2006.01)
  (Continued)

(52) U.S. Cl.
  CPC .......... *B23K 11/115* (2013.01); *B23K 11/253* (2013.01); *B23K 11/3009* (2013.01);
  (Continued)

(58) Field of Classification Search
  CPC . B23K 11/115; B23K 11/253; B23K 11/3009; B23K 11/311; B23K 11/314; B23K 11/317; Y10S 901/42; Y10S 901/23
  See application file for complete search history.

(56) References Cited

U.S. PATENT DOCUMENTS

2011/0257785 A1* 10/2011 Nihei ................. B25J 9/1674
                                                                700/254
2012/0031884 A1*  2/2012 Matsumoto ........... B23K 11/115
                                                                219/127

FOREIGN PATENT DOCUMENTS

CN          2776614 Y     5/2006
CN        103042295 A     4/2013
              (Continued)

OTHER PUBLICATIONS

Machine translation of Japan Patent document No. 2004-195,545, Sep. 2017.*

(Continued)

*Primary Examiner* — Geoffrey S Evans
(74) *Attorney, Agent, or Firm* — Hauptman Ham, LLP

(57) ABSTRACT

A spot welding system 10 includes a spot welding gun having an opposite electrode 44, a movable electrode 48, and a drive part 52, a position detection part 54 that detects a position of the movable electrode 48, and a pressure change calculation part that calculates an amount of change between first pressurizing force at a first attitude and second pressurizing force at a second attitude based on a first position of the movable electrode 48 when the drive part 52 has been driven by a first pressurizing force command at the first attitude, a second position of the movable electrode 48 when the drive part 52 has been driven by the first pressurizing force command at the second attitude, and the first pressurizing force command. The first pressurizing force command and the first pressurizing force coincide with each other.

15 Claims, 11 Drawing Sheets

(51) Int. Cl.
   *B23K 11/31*      (2006.01)
   *B23K 11/25*      (2006.01)
(52) U.S. Cl.
   CPC ........... *B23K 11/311* (2013.01); *B23K 11/314*
                        (2013.01); *B23K 11/317* (2013.01)

(56) References Cited

FOREIGN PATENT DOCUMENTS

| | | |
|---|---|---|
| CN | 103624385 A | 3/2014 |
| EP | 652070 A1 * | 5/1995 |
| JP | 10-249543 A | 9/1998 |
| JP | 2001-47249 A | 2/2001 |
| JP | 3503359 B2 | 3/2004 |
| JP | 2004-195545 A * | 7/2004 |
| JP | 2004-195545 A | 7/2004 |
| JP | 2005-066654 A * | 3/2005 |
| JP | 2005-066654 A | 3/2005 |
| JP | 2006-218525 A | 8/2006 |
| JP | 2012-179657 A | 9/2012 |
| JP | 2014-42931 A | 3/2014 |
| JP | 2014-188585 A | 10/2014 |

OTHER PUBLICATIONS

Machine translation of Japan Patent document No. 2005-066,654, Sep. 2017.*

* cited by examiner

US 9,999,937 B2

SPOT WELDING SYSTEM, METHOD AND COMPUTER PROGRAM CAPABLE OF MAKING PRESSURIZING FORCE APPLIED TO OBJECT TO BE PRESSED TO BE CONSTANT

RELATED APPLICATIONS

The present application claims priority to Japanese Application Number 2014-226274, filed Nov. 6, 2014, the disclosure of which is hereby incorporated by reference herein in its entirety.

BACKGROUND OF THE INVENTION

1. Field of the Invention

The invention relates to a spot welding system capable of allowing pressurizing force applied to an object that is pressed to be constant, a method, and a computer program.

2. Description of the Related Art

Pressurizing force, which is applied to an object to be pressed such as a workpiece to be welded from a movable electrode of a spot welding gun, changes at each attitude of the spot welding gun. In order to allow the pressurizing force changed as above to be constant, there have been known technologies of measuring a change in the pressurizing force due to the movable electrode at each attitude of the spot welding gun by using a pressure sensor and calibrating a pressurizing force command to a servomotor that drives the movable electrode based on the measured change in the pressurizing force (Japanese Laid-open Patent Publication No. 2004-195545 and Japanese Laid-open Patent Publication No. 2005-66654).

According to the aforementioned conventional technique, since the attitudes of the spot welding gun are changed a plurality of times and pressurizing force due to the movable electrode is measured by the pressure sensor at the respective attitudes, calibration work is complicated.

SUMMARY OF THE INVENTION

In an aspect of the invention, a spot welding system comprises a spot welding gun including an opposite electrode, a movable electrode arranged so as to be movable relative to the opposite electrode, and a drive part which drives the movable electrode; and a position detection part which detects a position of the movable electrode.

Further, the spot welding system comprises a pressure change calculation part, wherein, based on a first position of the movable electrode detected when the drive part is driven in accordance with a first pressurizing force command so as to pressurize an object to be pressed by the movable electrode in a state where the spot welding gun is arranged at a predetermined first attitude, on a second position of the movable electrode detected when the drive part is driven in accordance with the first pressurizing force command so as to pressurize the object by the movable electrode in a state where the spot welding gun is arranged at a second attitude different from the first attitude, and on the first pressurizing force command, the pressure change calculation part calculates an amount of change between a first pressurizing force applied to the object from the movable electrode at the first attitude and a second pressurizing force applied to the object from the movable electrode at the second attitude.

The first pressurizing force command and the first pressurizing force match with each other. The drive part may include a servomotor. A correlation between the first pressurizing force and a feedback value from the servomotor when the servomotor is driven in accordance with the first pressurizing force command at the first attitude so as to pressurize the object by the movable electrode may be calibrated in advance, in order to match the first pressurizing force command and the first pressurizing force with each other.

The pressure change calculation part may also calculate the amount of change based on a relation in which a ratio of the second position with respect to the first position is equal to a ratio of the second pressurizing force with respect to the first pressurizing force.

The pressure change calculation part may calculate the amount of change based on a third position detected when the drive part is driven in accordance with a third pressurizing force command so as to pressurize the object by the movable electrode in a state where the spot welding gun is arranged at the first attitude, and on the third pressurizing force command.

The pressure change calculation part may also calculate the amount of change based on a relation in which a ratio of a difference between the second position and the third position with respect to a difference between the first position and the third position is equal to a ratio of a difference between the second pressurizing force and the third pressurizing force command with respect to a difference between the first pressurizing force and the third pressurizing force command.

The spot welding gun may further include a first arm that supports the opposite electrode and a second arm that supports the movable electrode and is provided so as to be movable relative to the first arm.

The spot welding system may further comprise a position correction part which corrects the position detected by the position detection part by multiplying the position by a ratio of a first deformation amount of the first arm to a sum of the first deformation amount and a second deformation amount of the second arm when the opposite electrode is pressurized by the movable electrode with a predetermined force.

The spot welding system may further comprise a pressurizing force command determination part which determinates a second pressurizing force command for driving the drive part at the second attitude based on the amount of change calculated by the pressure change calculation part.

The pressure change calculation part may arrange the spot welding gun at a plurality of attitudes different from the first attitude; calculate amounts of change between the first pressurizing force and a pressurizing force applied to the opposite electrode from the movable electrode when the drive part is driven in accordance with the first pressurizing force command, for each of the plurality of attitudes; and calculate a correlation between the attitude of the spot welding gun and the amount of change based on the plurality of calculated amounts of change. The object to be pressed may be the opposite electrode.

In another aspect of the invention, a method is for calculating an amount of change in a pressurizing force which is changed in response to an attitude of a spot welding gun including an opposite electrode, the movable electrode movable relative to the opposite electrode, and a drive part for driving the movable electrode, and which is applied to an object to be pressed from the movable electrode in the spot welding gun.

The method comprises steps of arranging the spot welding gun at a first attitude; detecting a first position of the movable electrode when the drive part is driven in accordance with a first pressurizing force command so as to pressurize the object by the movable electrode; and arranging the spot welding gun at a second attitude different from the first attitude.

Further, the method comprises steps of detecting a second position of the movable electrode when the drive part is driven in accordance with the first pressurizing force command so as to pressurize the object by the movable electrode; and calculating an amount of change between a first pressurizing force applied to the object from the movable electrode at the first attitude and a second pressurizing force applied to the object from the movable electrode at the second attitude, based on the first position, the second position, and the first pressurizing force command.

In the method, the first pressurizing force command and the first pressurizing force match with each other. The method may further include a step of calibrating in advance a correlation between the first pressurizing force and a feedback value from the servomotor when the servomotor is driven in accordance with the first pressurizing force command at the first attitude so as to pressurize the object by the movable electrode, in order to match the first pressurizing force command and the first pressurizing force coincide with each other.

In the method, the amount of change may be calculated based on a relation in which a ratio of the second position with respect to the first position is equal to a ratio of the second pressurizing force with respect to the first pressurizing force.

The method may further include a step of calculating a third position when the drive part is driven by a third pressurizing force command so as to pressurize the object by the movable electrode, after detecting the first position. The amount of change may be calculated based on the third position and the third pressurizing force command.

In the method, the amount of change may also be calculated based on a relation in which a ratio of a difference between the second position and the third position with respect to a difference between the first position and the third position is equal to a ratio of a difference between the second pressurizing force and the third pressurizing force with respect to a difference between the first pressurizing force and the third pressurizing force. In still another aspect of the invention, a computer program causes a computer to execute the above-mentioned method.

DESCRIPTION OF EMBODIMENTS

Figure 1:
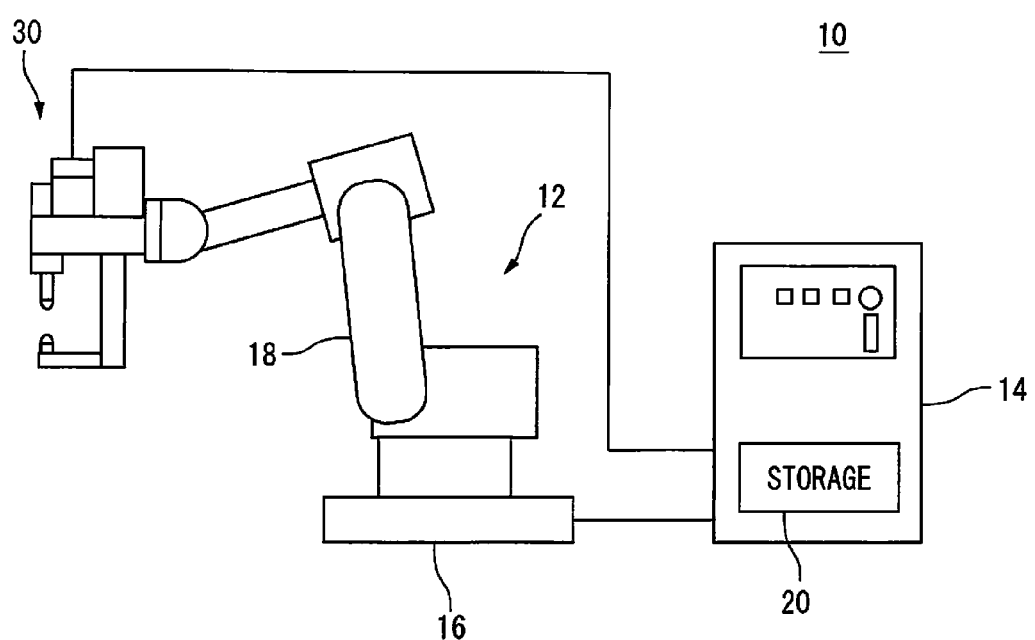
FIG. 1 is a schematic view of a spot welding system according to an embodiment of the invention.
Figure 2:
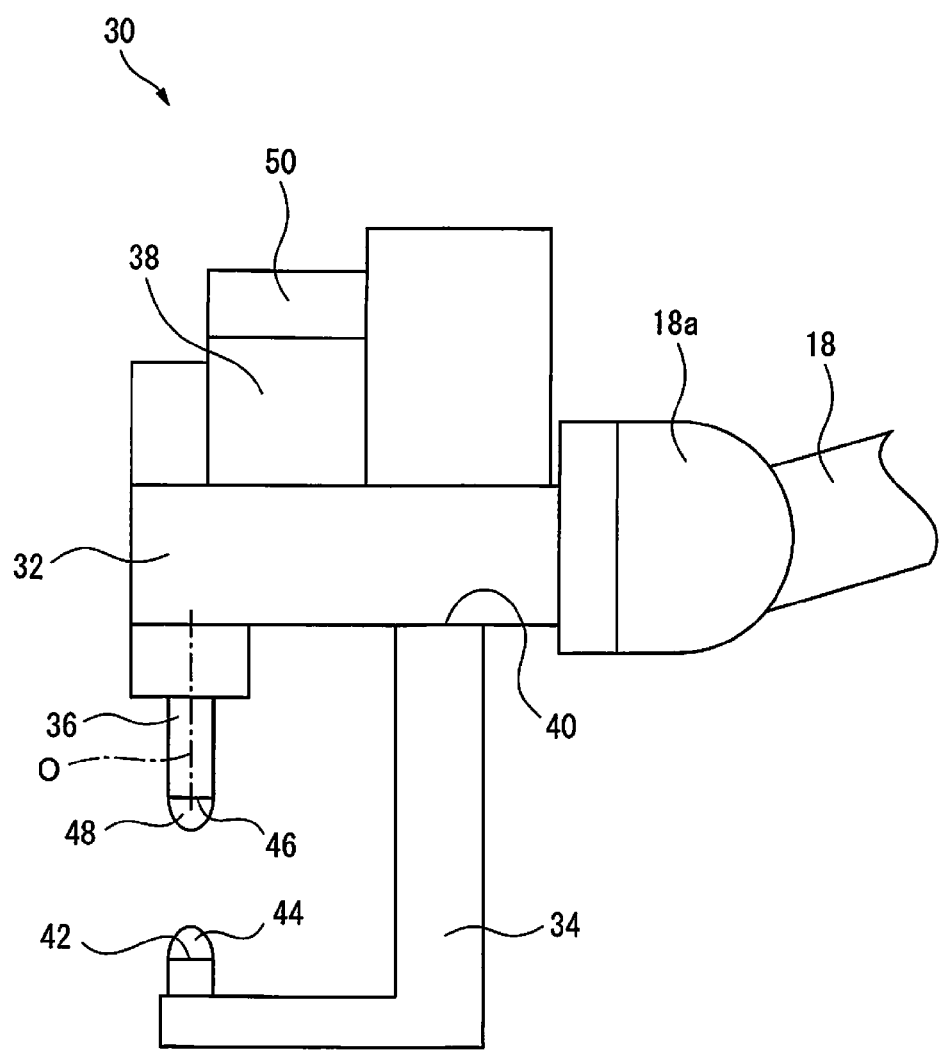
FIG. 2 is an enlarged view of the spot welding gun illustrated in FIG. 1.
Figure 3:
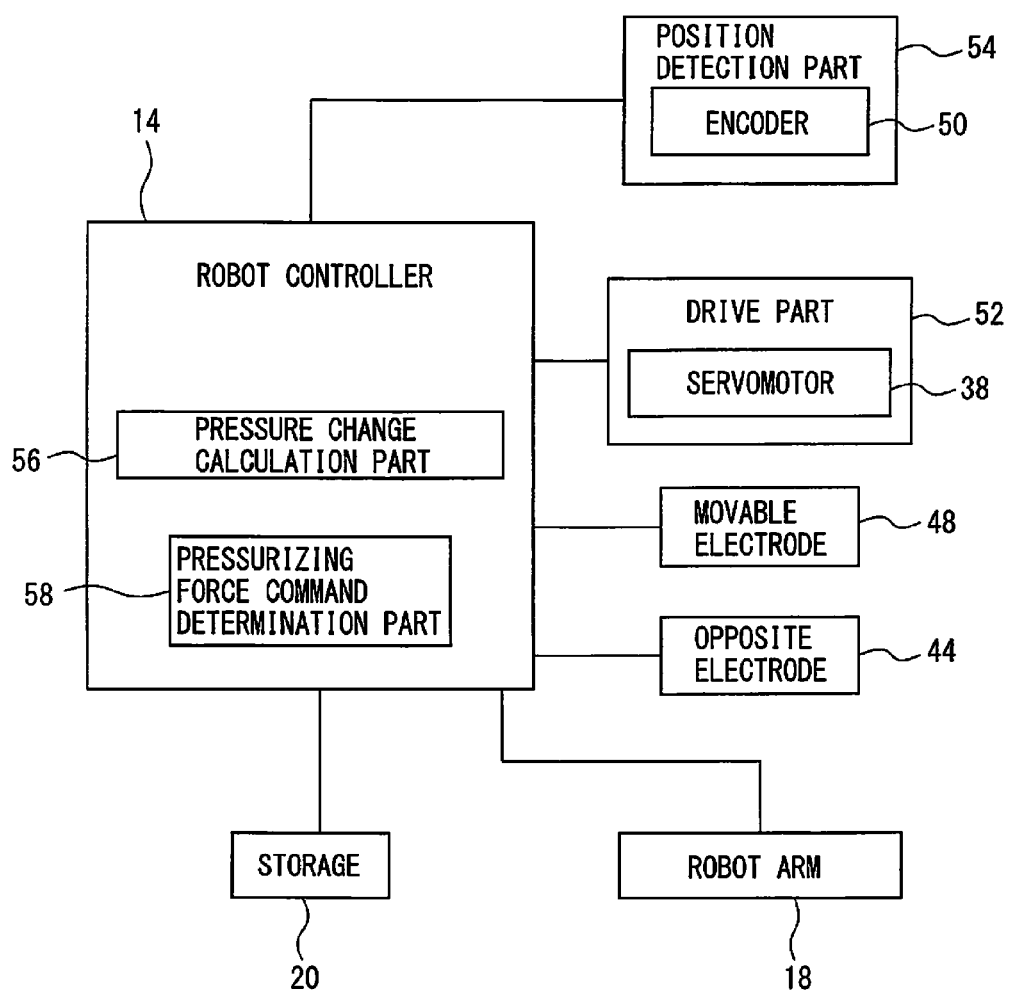
FIG. 3 is a block diagram of the spot welding system illustrated in FIG. 1.

Hereinafter, an embodiment of the invention will be described based on the drawings. With reference to FIG. 1 to FIG. 3, a spot welding system 10 according to an embodiment of the invention will be described. The spot welding system 10 includes a robot 12, a robot controller 14, and a spot welding gun 30.

The robot 12 is e.g. a vertical articulated robot, and includes a base 16 fixed to a floor and a robot arm 18 rotatably connected to the base 16. The spot welding gun 30 according to this embodiment is a so-called C-type spot gun, which is provided at a front end of the robot arm 18 so as to be moved by the robot arm 18.

The robot controller 14 directly or indirectly controls each element of the robot 12 and the spot welding gun 30. The robot controller 14 has a storage 20 therein. The storage 20 is e.g. an electrically erasable and recordable nonvolatile memory, and is configured by EEPROM (a registered trademark), etc.

The storage 20 stores a constant, a variable, a setting value, a program, etc. which are necessary for the operation of the spot welding system 10, such as a robot program used for operating the robot 12.

As illustrated in FIG. 2, the spot welding gun 30 includes a base part 32, a fixed arm (first arm) 34, a movable arm (second arm) 36, and a servomotor 38. The base part 32 is connected to the front end of robot arm 18 via a wrist 18a.

The fixed arm 34 is fixed to the base part 32 at its proximal end 40, while supports an opposite electrode 44 at its distal end 42. In this embodiment, the fixed arm 34 extends from the proximal end 40 to the distal end 42 so as to be curved in substantially L-shape.

The movable arm 36 is provided at the base part 32 so as to be movable along a gun axis O. In this embodiment, the movable arm 36 is a rod member which linearly extends so as to be mechanically connected to an output shaft (not illustrated) of the servomotor 38 via a motion conversion mechanism (not illustrated) at its upper end (not illustrated), while support a movable electrode 48 at its lower end 46.

The motion conversion mechanism includes e.g. a ball screw mechanism or a mechanism comprised of a timing belt and pulley, and converts rotary motion of the output shaft of the servomotor 38 into reciprocal motion along the gun axis O.

The movable arm 36 is driven to reciprocate along the gun axis O by the servomotor 38 via the motion conversion mechanism. The opposite electrode 44 and the movable electrode 48 are positioned on the gun axis O.

The opposite electrode 44 and the movable electrode 48 are energized in response to a command from the robot controller 14. In this way, the opposite electrode 44 and the movable electrode 48 spot-welds a workpiece to be welded which is held therebetween.

The movable electrode 48 reciprocates along the gun axis O in directions toward and away from the opposite electrode 44, as the movable arm 36 is driven by the servomotor 38.

The servomotor 38 drives the movable arm 36 via the motion conversion mechanism in response to the command from the robot controller 14 so as to move the movable electrode 48. Thus, the servomotor 38 functions as a drive part 52 (FIG. 3) which drives the movable arm 36 and the movable electrode 48.

An encoder 50 is attached to the servomotor 38. The encoder 50 detects a rotational position of the servomotor 38, and transmits it to the robot controller 14. Note that, a Hall element etc. may be applied, instead of the encoder 50.

The robot controller 14 controls the operation of the robot arm 18. The robot controller 14 can change the attitude of the spot welding gun 30 by operating the robot arm 18.

Next, with reference to FIG. 1 to FIG. 8, the operation of the spot welding system 10 will be described. When spot-welding a workpiece W to be welded by the spot welding system 10, the robot controller 14 drives the servomotor 38 to move the movable arm 36 so that the workpiece W is held between the movable electrode 48 and the opposite electrode 44, as illustrated in FIG. 4.

The pressurizing force actually applied to the workpiece W from the movable electrode 48 and the opposite electrode 44 at this time may be changed depending on the attitude of the spot welding gun 30. For example, at the attitude of the spot welding gun 30 illustrated in FIG. 4, the gun axis O matches the vertical direction, and the movable electrode 48 is positioned at vertically upward of the opposite electrode 44.

Figure 4:
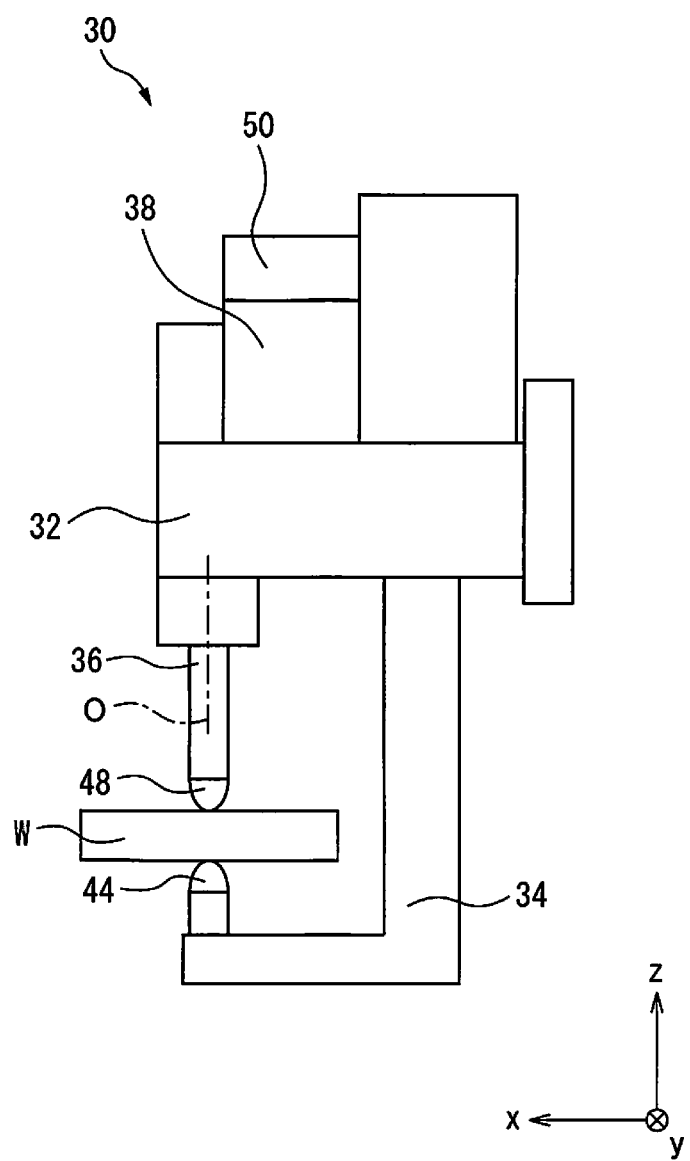
FIG. 4 illustrates a state in which the spot welding gun is arranged at a first attitude.

Note that, z-axis plus direction in FIG. 4 indicates the vertical direction, and an x-y plane is a horizontal plane perpendicular to z-axis. Assuming that, at the attitude illustrated in FIG. 4, the robot controller 14 transmits a predetermined pressurizing force command $P_0$ to the servomotor 38 so as to pressurize the workpiece W by the movable electrode 48 in accordance with the pressurizing force command $P_0$.

Figure 5:
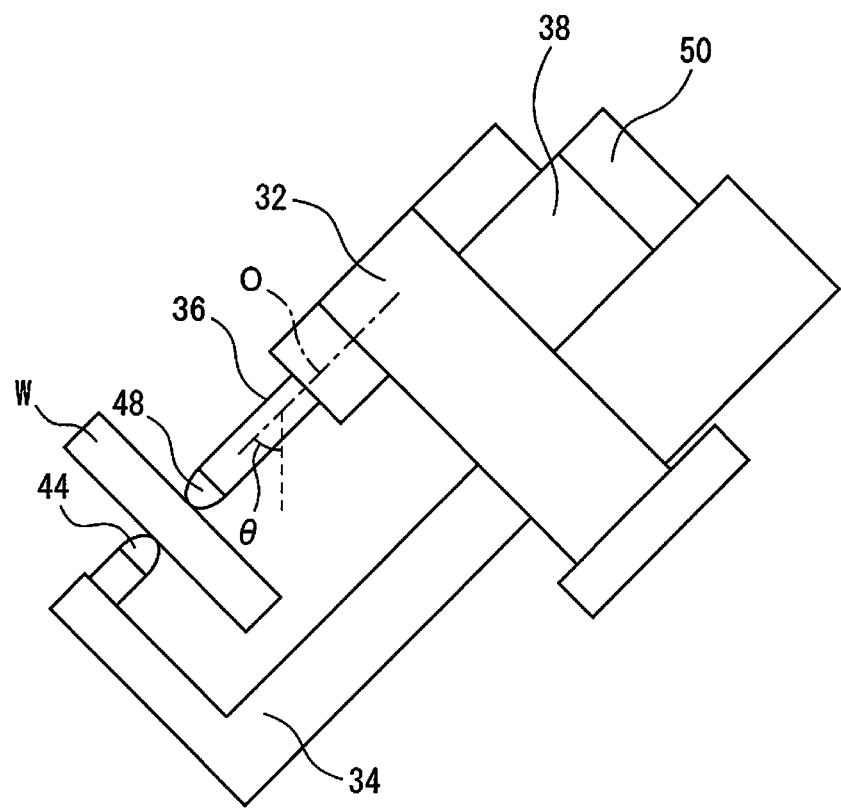
FIG. 5 illustrates a state in which the spot welding gun has been rotated from the first attitude.
Figure 6:
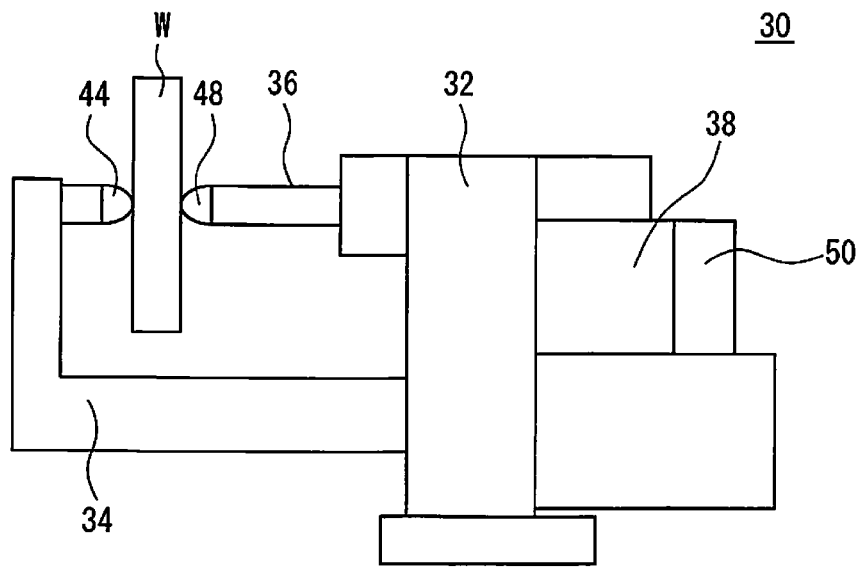
FIG. 6 illustrates a state in which the spot welding gun has been rotated from the first attitude.
Figure 7:
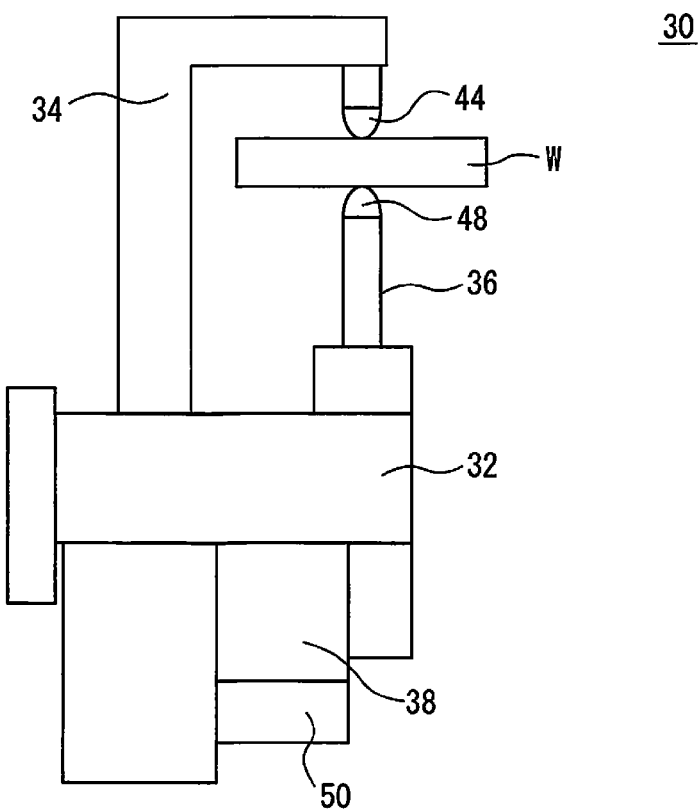
FIG. 7 illustrates a state in which the spot welding gun has been rotated from the first attitude.

The pressurizing force applied to the workpiece W from the movable electrode 48 at this time becomes a resultant force of a force component $F_m$ generated when a torque of the servomotor 38 is converted to a force along the gun axis O by the motion conversion mechanism and of a gravity component $F_g$ of a movable part including the motion conversion mechanism and the movable electrode 48. Next, assuming that the spot welding gun 30 is rotated about y-axis in FIG. 4 by an angle θ from the attitude illustrated in FIG. 4, and pressurizes the workpiece W by the movable electrode 48 in accordance with the same pressurizing force command $P_0$. The pressurizing force actually applied to the workpiece W from the movable electrode 48 at this time becomes a resultant force of the above-mentioned force component $F_m$ and a force component $F_g \cos θ$ obtained by multiplying the above-mentioned gravity component $F_g$ by $\cos θ$. Accordingly, the pressurizing force at this attitude is reduced by $F_g(1-\cos θ)$ as compared with the pressurizing force at the attitude illustrated in FIG. 4. Therefore, as the spot welding gun 30 is rotated about y-axis by θ=+45°, +90°, and +180° (the clockwise direction when viewed from the front side of FIG. 4 is defined as "+" rotational direction) as illustrated in FIG. 5, FIG. 6, and FIG. 7, the pressurizing force actually applied to the workpiece W from the movable electrode 48 is decreased.

If the force (i.e., the force by which the workpiece W is held between the movable electrode 48 and the opposite electrode 44) applied to the workpiece W from the movable electrode 48 changes depending on the attitude of the spot welding gun 30, the welding quality may be degraded.

Figure 8:
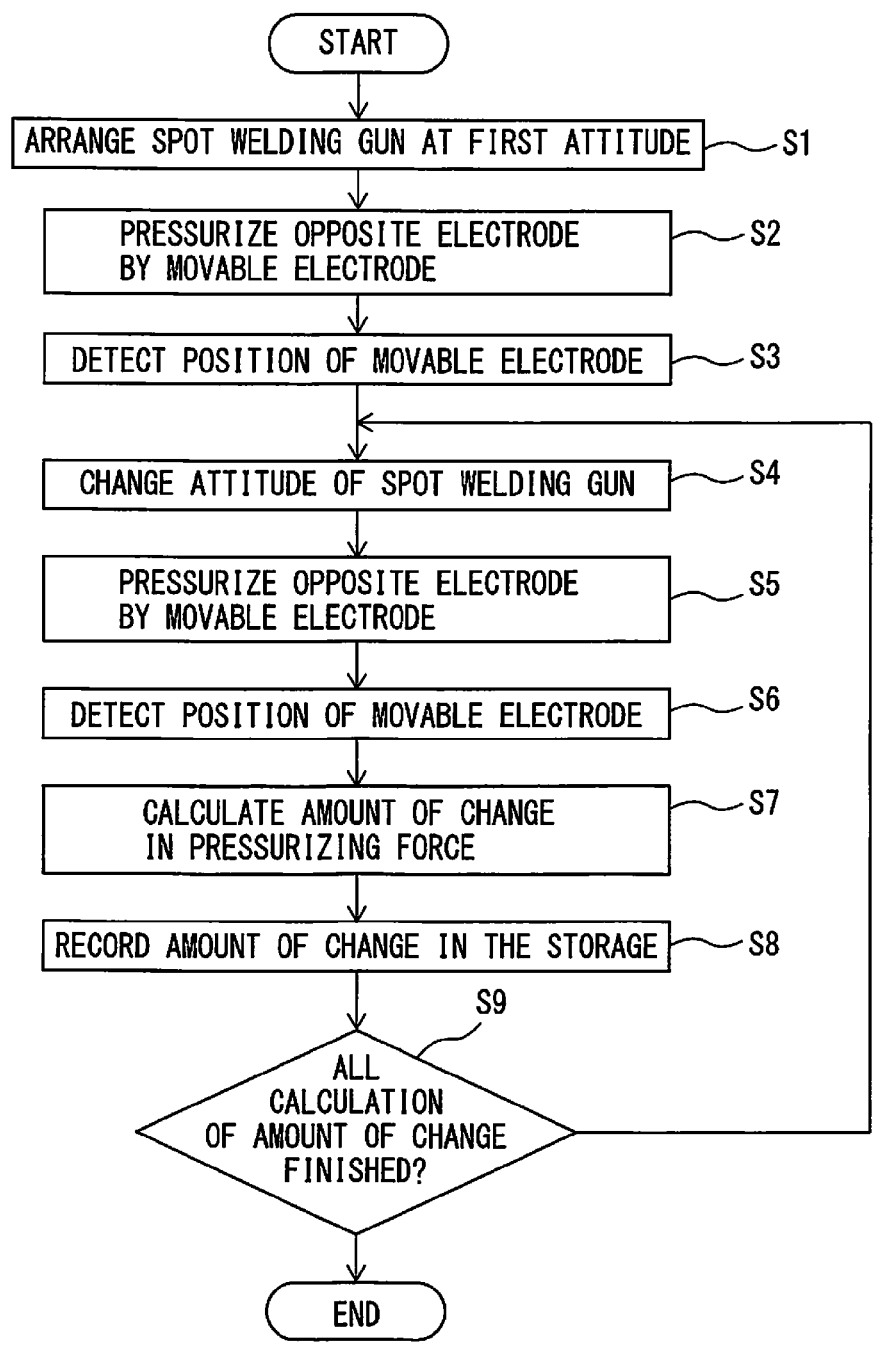
FIG. 8 is a flowchart of an operation flow of the spot welding system, according to an embodiment of the invention.

The spot welding system 10 according to this embodiment executes a flow illustrated in FIG. 8 so as to calculate an amount of change in the pressurizing force due to the attitude of the spot welding system 10 in order to make the force for pressurizing the workpiece W by the movable electrode 48 and the opposite electrode 44 to be constant.

Before the flow illustrated in FIG. 8 is executed, the spot welding gun 30 is arranged at a predetermined first attitude, and a calibration is executed so that a pressurizing force command to the servomotor 38 and a pressurizing force applied to the opposite electrode 44 from the movable electrode 48 match with each other.

In particular, a pressure sensor (not illustrated) is arranged between the movable electrode 48 and the opposite electrode 44. Then, the robot controller 14 drives the servomotor 38 in accordance with a predetermined pressurizing force command so as to hold the pressure sensor between the movable electrode 48 and the opposite electrode 44, and then measures the pressurizing force.

On the other hand, the robot controller 14 acquires a feedback value (for example, a load torque, a feedback current, or an estimated disturbance torque which can be estimated from a control model of the servomotor 38) from the servomotor 38 at this time. In this way, the robot controller 14 acquires a correlation between the actual pressurizing force measured by the pressure sensor and the feedback value.

Based on the correlation, the correlation is calibrated so that the pressurizing force command to the servomotor 38 and the pressurizing force applied to the opposite electrode 44 from the movable electrode 48 match with each other at the first attitude. The first attitude is set to the attitude illustrated in FIG. 4, for example.

When the calibration is ended, the flow illustrated in FIG. 8 is started. At step S1, the robot controller 14 arranges the spot welding gun 30 at the above-mentioned first attitude. In particular, the robot controller 14 operates the robot arm 18 so as to arrange the spot welding gun 30 at the attitude illustrated in FIG. 4.

At step S2, the robot controller 14 drives the servomotor 38 in accordance with a first pressurizing force command $P_1$ so as to pressurize the opposite electrode 44 as an object to be pressed by the movable electrode 48. Specifically, the robot controller 14 sends the first pressurizing force command $P_1$ to the servomotor 38.

The servomotor 38 moves the movable arm 36 toward the opposite electrode 44 in response to the received first pressurizing force command $P_1$, thereby press the movable electrode 48 against the opposite electrode 44. When the feedback value from the servomotor 38 reaches a value corresponding to the first pressurizing force command $P_1$, the robot controller 14 stops the operation of the servomotor 38.

At this time, the movable electrode 48 pressurizes the opposite electrode 44 with a first pressurizing force $F_1$. As described above, since the pressurizing force command to the servomotor 38 is calibrated so as to match with the pressurizing force applied to the opposite electrode 44 from the movable electrode 48 at the first attitude, the first pressurizing force $F_1$ can be regarded to match with the first pressurizing force command $P_1$.

At step S3, the robot controller 14 detects a first position $D_1$ of the movable electrode 48. In particular, the robot controller 14 acquires a first rotational position $R_1$ of the servomotor 38 from the encoder 50.

A rotation angle of the servomotor 38 acquired by the encoder 50 and a position of the movable electrode 48 have a correlation according to a pitch feed amount of the motion conversion mechanism. Accordingly, the first position $D_1$ of the movable electrode 48 can be found from the first rotational position $R_1$ acquired by the encoder 50. Thus, in this embodiment, the encoder 50 functions as a position detection part 54 (FIG. 3) for detecting the position of the movable electrode 48.

At step S4, the robot controller 14 changes the attitude of the spot welding gun 30. For example, the robot controller 14 operates the robot arm 18 so as to rotate the spot welding gun 30 about y-axis in FIG. 4 by a predetermined angle θ (e.g., +30°). As a result, the spot welding gun 30 is arranged at a second attitude different from the first attitude at step S1.

At step S5, the robot controller 14 drives the servomotor 38 in accordance with the first pressurizing force command $P_1$ so as to pressurize the opposite electrode 44 by the movable electrode 48. In particular, until the feedback value from the servomotor 38 reaches a value corresponding to the first pressurizing force command $P_1$, the robot controller 14 drives the servomotor 38 so as to move the movable arm 36 in the direction toward the opposite electrode 44.

At step S6, the robot controller 14 detects a second position $D_2$ of the movable electrode 48. In particular, the robot controller 14 acquires a second rotational position $R_2$ of the servomotor 38 from the encoder 50.

As described above, when the spot welding gun 30 is rotated about y-axis from the first attitude, and the servomotor 38 is driven by the same pressurizing force command, the pressurizing force actually applied to the opposite electrode 44 from the movable electrode 48 is decreased by $F_g$ (1-cos θ) as compared with the pressurizing force at the first attitude. Consequently, a second pressurizing force $F_2$ actually applied to the opposite electrode 44 from the movable electrode 48 at step S5 becomes smaller than the first pressurizing force $F_1$.

On the other hand, the pressurizing force applied between the movable electrode 48 and the opposite electrode 44 corresponds to a reactive force due to elastic deformation of the fixed arm 34, and an elastic coefficient of the fixed arm 34 is always constant regardless of an attitude. Therefore, if the pressurizing force applied between the movable electrode 48 and the opposite electrode 44 is changed due to the change of the attitude, an elastic deformation amount of the fixed arm 34 is also changed. Accordingly, the second position $D_2$ (the second rotational position $R_2$) detected at step S6 is different from the first position $D_1$ (the first rotational position $R_1$).

At step S7, the robot controller 14 calculates an amount of change $\delta_\theta$ between the first pressurizing force $F_1$ applied between the movable electrode 48 and the opposite electrode 44 at the first attitude and the second pressurizing force $F_2$ applied between the movable electrode 48 and the opposite electrode 44 at the second attitude.

Since the elastic coefficient of the fixed arm 34 is always constant regardless of the attitude, there is a relation among the first position $D_1$, the second position $D_2$, the first pressurizing force $F_1$, and the second pressurizing force $F_2$, as indicated by the following Equation 1.

$$D_1/D_2 = F_1/F_2 \quad \text{(Equation 1)}$$

As described above, the first pressurizing force $F_1$ in Equation 1 can be found from the first pressurizing force command $P_1$ calibrated with respect to the first pressurizing force $F_1$. Accordingly, it is possible to find the amount of change $\delta_\theta$ (=$F_1$-$F_2$) between the first pressurizing force $F_1$ and the second pressurizing force $F_2$ from Equation 1.

Thus, in this embodiment, the robot controller 14 functions as a pressure change calculation part 56 (FIG. 3) which calculates the amount of change $\delta_\theta$ based on the first position $D_1$, the second position $D_2$, and the first pressurizing force $F_1$ (i.e., the first pressurizing force command $P_1$).

Note that, it is also possible to calculate the amount of change $\delta_\theta$ from the first rotational position $R_1$ and the second rotational position $R_2$. In particular, the amount of change $\delta_\theta$ (=$F_1$-$F_2$) between the first pressurizing force $F_1$ and the second pressurizing force $F_2$ can be found from the following Equation 2.

$$R_1/R_2 = F_1/F_2 \quad \text{(Equation 2)}$$

At step S8, the robot controller 14 records the calculated amount of change $\delta_\theta$ in the storage 20. At step S9, the robot controller 14 determines whether the calculation of the amount of change $\delta_\theta$ in the pressurizing force has been finished at all attitudes of the spot welding gun 30 designated by a user.

The robot controller 14 determines "YES" when the amount of change $\delta_\theta$ in the pressurizing force has been calculated at all of the designated attitudes, and ends the flow illustrated in FIG. 8. On the other hand, when the robot controller 14 determines "NO", the robot controller 14 returns to step S4, changes the attitude of the spot welding gun 30, and calculates an amount of change $\delta_{2\theta}$ in the pressurizing force at the changed attitude.

As an example, the robot controller 14 receives a command from the user for sequentially changing the attitude of the spot welding gun 30 by intervals of 30° in the range of −180° to +180° with respect to the first attitude (i.e., θ=0°, and calculating the amount of change $\delta_\theta$ in the pressurizing force at the respective attitudes.

When receiving such command, the robot controller 14 loops steps S4 to S9 with respect to the attitudes of θ=−180°, −150°, −120°, −90°, −60°, −30°, 0° (i.e., the first attitude), 30°, 60°, 90°, 120°, 150°, and 180°.

Figure 9:
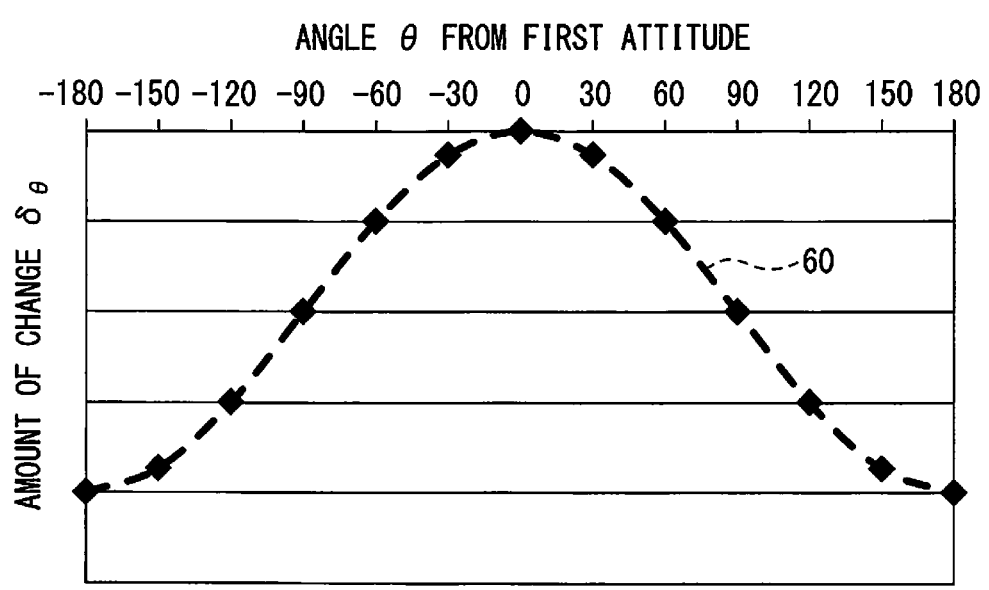
FIG. 9 is a graph illustrating a relation between an attitude of the spot welding gun and an amount of change of a pressurizing force.

As a result, a data table illustrated in FIG. 9 can be obtained. Note that, the vertical axis of FIG. 9 indicates the amount of change $\delta_\theta$ in the pressurizing force applied between the movable electrode 48 and the opposite electrode 44, while the horizontal axis denotes the angle about y-axis from the first attitude (θ=0°).

As illustrated in FIG. 9, if the data table of the amount of changes $\delta_\theta$ in the pressurizing force for each attitude is created, it is possible to estimate an amount of change in a pressurizing force at an unmeasured attitude (for example, θ=45° from the tendency of the amount of change $\delta_\theta$ at the measured attitudes near the unmeasured attitude (e.g., $\delta_{30°}$ and $\delta_{60°}$). As an example, a dotted line 60 in FIG. 9 indicates a graph of the correlation between the angle θ from the first attitude and the amount of change $\delta_\theta$, which can be obtained from the plurality of acquired amount of changes $\delta_\theta$.

In this embodiment, the spot welding gun 30 is a so-called C-type spot gun. Accordingly, the correlation between the angle θ from the first attitude and the amount of change $\delta_\theta$ in the pressurizing force when the spot welding gun 30 is rotated about x-axis in FIG. 4 is substantially similar to that of FIG. 9. The robot controller 14 records the thus calculated data table as shown in FIG. 9 in the storage 20.

When welding the workpiece, the robot controller 14 determines a pressurizing force command for driving the servomotor 38 at an arbitrary attitude of the spot welding gun 30, based on the stored data table of FIG. 9.

For example, assuming that the robot controller 14 operates the robot arm 18 so as to arrange the spot welding gun 30 at the attitude illustrated in FIG. 7 (i.e., θ=±180°). In this case, the robot controller 14 reads out the data table stored in the storage 20, and calculates an amount of change $\delta_{180°}$ corresponding to the attitude (θ=+180°).

Then, the robot controller 14 converts the amount of change $\delta_{180°}$ into a pressurizing force command to the servomotor 38, and corrects the first pressurizing force command $P_1$ by the converted pressurizing force command, thereby determines a second pressurizing force command $P_2$ for driving the servomotor 38 at the attitude illustrated in FIG. 7.

In this way, even at the attitude illustrated in FIG. 7, it is possible to pressurize the workpiece W by the movable electrode 48 and the opposite electrode 44 with a pressurizing force equal to the first pressurizing force $F_1$. Thus, in this embodiment, the robot controller 14 functions as a pressurizing force command determination part 58 (FIG. 3) which determines the second pressurizing force command $P_2$ based on the calculated amount of change $\delta_\theta$.

Note that, the first pressurizing force $F_1$ in the above-mentioned Equation 1 coincides with the first pressurizing force command $P_1$. Accordingly, the second pressurizing force command $P_2$ at the second attitude may be calculated by the following Equation 3.

$$D_1/D_2 = P_1/F_2$$

$$P_2 = P_1 \times D_2/D_1 \quad \text{(Equation 3)}$$

As described above, according to this embodiment, once the correlation between the first pressurizing force command $P_1$ and the first pressurizing force $F_1$ at the first attitude is calibrated, it is possible to calculate the amount of change $\delta_\theta$ in the pressurizing force at an arbitrary attitude without using an external device such as a pressure sensor.

Then, it is possible to correct a pressurizing force command to the servomotor 38 at an arbitrary attitude based on the amount of change $\delta_\theta$, thereby pressurize the workpiece with a pressurizing force the same as the calibrated pressurizing force $F_1$ at the arbitrary attitude. Due to this, it is possible to improve the accuracy of a pressurizing force upon welding, thereby the welding quality can be maintained.

Next, with reference to FIG. 10, another operation method of the spot welding system 10 will be described. Note that, in FIG. 10, steps similar to those in FIG. 8 are assigned the same reference numerals, and detailed descriptions thereof will be omitted.

In the operation method according to this embodiment, at step S11 after step S1, the robot controller 14 drives the servomotor 38 in accordance with a reference pressurizing force command $P_{Ref}$ (a third pressurizing force command) so as to pressurize the opposite electrode 44 by the movable electrode 48.

In particular, the robot controller 14 sends the reference pressurizing force command $P_{Ref}$ to the servomotor 38, and the servomotor 38 moves the movable arm 36 toward the opposite electrode 44 in response to the reference pressurizing force command $P_{Ref}$ so as to press the movable electrode 48 against the opposite electrode 44.

When the feedback value from the servomotor 38 reaches a value corresponding to the reference pressurizing force command $P_{Ref}$, the robot controller 14 stops the operation of the servomotor 38.

At this time, the movable electrode 48 pressurizes the opposite electrode 44 with a reference pressurizing force $F_{Ref}$. As described above, since the pressurizing force command to the servomotor 38 is calibrated so as to match the pressurizing force applied to the opposite electrode 44 from the movable electrode 48 at the first attitude, the reference pressurizing force $F_{Ref}$ can be regarded to match the reference pressurizing force command $P_{Ref}$.

The reference pressurizing force command $P_{Ref}$ is set to be different from the first pressurizing force command $P_1$ (e.g., $P_{Ref} < P_1$). Accordingly, the reference pressurizing force $F_{Ref}$ is different from the first pressurizing force $F_1$ (e.g., $F_{Ref} < F_1$)

At step S12, the robot controller 14 detects a reference position $D_{Ref}$ (a third position) of the movable electrode 48. In particular, the robot controller 14 acquires a reference rotational position $R_{Ref}$ of the servomotor 38 from the encoder 50. The reference position $D_{Ref}$ of the movable electrode 48 can be found from the reference rotational position $R_{Ref}$ acquired by the encoder 50.

At step S13 after step S6, the robot controller 14 calculates an amount of change $\delta_\theta$ between the first pressurizing force $F_1$ applied between the movable electrode 48 and the opposite electrode 44 at the first attitude and the second pressurizing force $F_2$ applied between the movable electrode 48 and the opposite electrode 44 at the second attitude.

There is a relationship among the reference position $D_{Ref}$ acquired at step S11, the first position $D_1$ acquired at step S3, the second position $D_2$ acquired at step S6, the first pressurizing force $F_1$, the reference pressurizing force command $P_{Ref}$, and the second pressurizing force $F_2$, as indicated by the following Equation 4.

$$(D_1 - D_{Ref})/(D_2 - D_{Ref}) = (F_1 - P_{Ref})/(F_2 - P_{Ref}) \quad \text{(Equation 4)}$$

The first pressurizing force $F_1$ in Equation 4 can be found from the first pressurizing force command $P_1$ calibrated with respect to $F_1$. Accordingly, it is possible to find the amount of change $\delta_\theta$ ($=F_1-F_2$) between the first pressurizing force $F_1$ and the second pressurizing force $F_2$.

According to this embodiment, it is possible to calculate the amount of changes $\delta_\theta$ in the pressurizing force more accurately. This advantageous effect will be described below. The position $D_n$ of the movable electrode 48 is generally defined as an amount by which the movable electrode 48 has moved from a zero position (i.e., 0.0 mm) which is defined as a position of the movable electrode 48 when the tip of the movable electrode 48 contacts that of the opposite electrode 44.

However, in fact, the zero position may be slightly shifted. If the calculation of the amount of changes $\delta_\theta$ in the pressurizing force is performed in such a state, an error may occur in a calculation result. In this embodiment, as indicated by the above Equation 4, the reference pressurizing force command $P_{Ref}$ and the reference position $D_{Ref}$ are introduced, and the amount of change $\delta_\theta$ is calculated based on the difference between the position $D_1$, $D_2$ and the reference position $D_{Ref}$, and on the difference between the pressurizing force $F_1$, $F_2$ and the reference pressurizing force command $P_{Ref}$.

According to this method, since both of the reference position $D_{Ref}$ and the first position $D_1$ are obtained at the same first attitude, it is possible to offset the error even if the above-mentioned zero position is slightly shifted. As a result, it is possible to calculate the amount of change $\delta_\theta$ in the pressurizing force more accurately.

In addition, according to the method, it is also possible to offset the error even if an offset error slightly occurs in a force sensor used upon the calibration, thereby a constant error occurs in the calibration of the pressurizing force.

Figure 10:
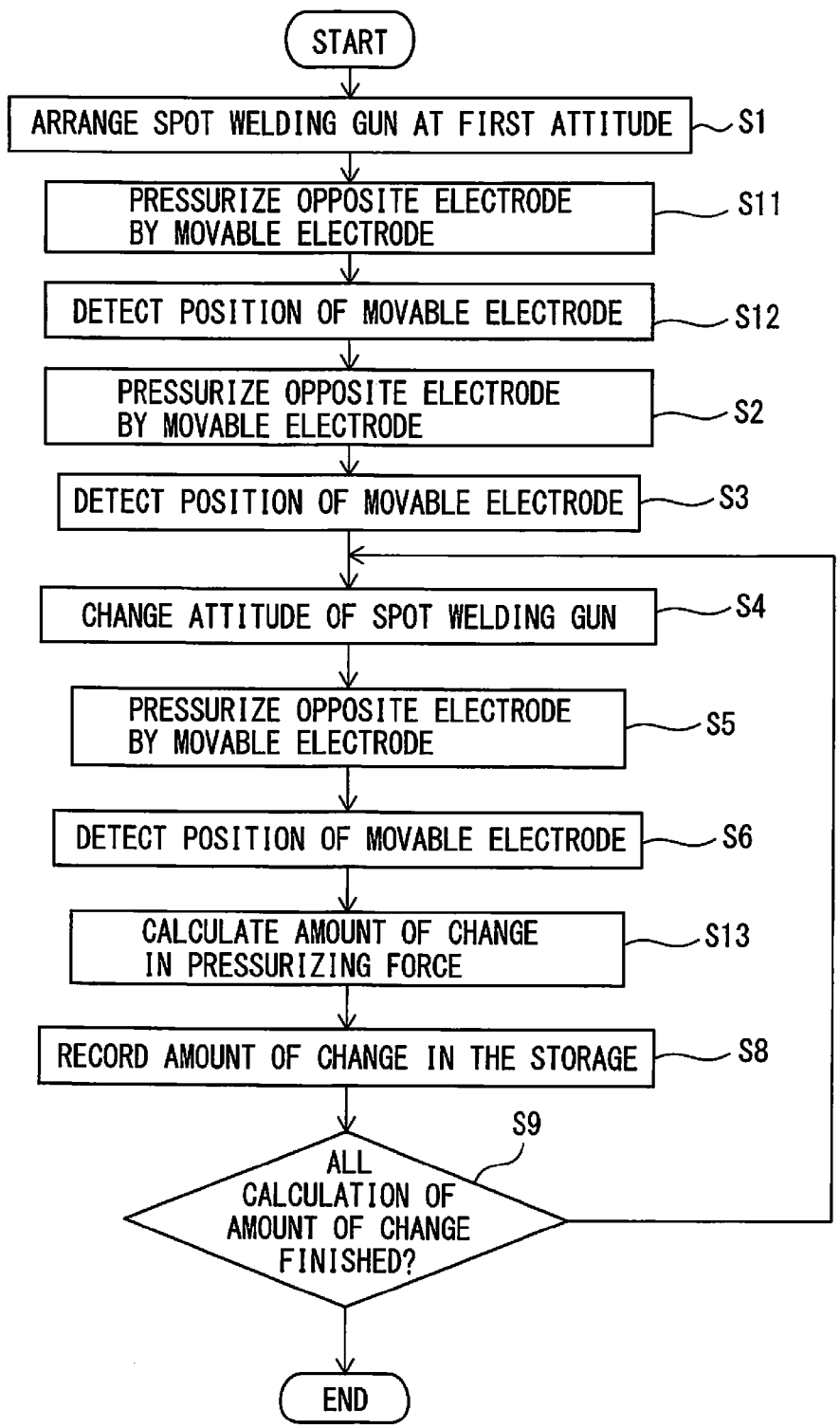
FIG. 10 is a flowchart of an operation flow of the spot welding system, according to another embodiment of the invention.

Note that, the storage 20 may pre-record a computer program which causes a computer to execute the operation flows illustrated in FIG. 8 and FIG. 10. The robot controller 14 may automatically execute the operation flows illustrated in FIG. 8 and FIG. 10 according to the computer program before spot-welding.

Figure 11:
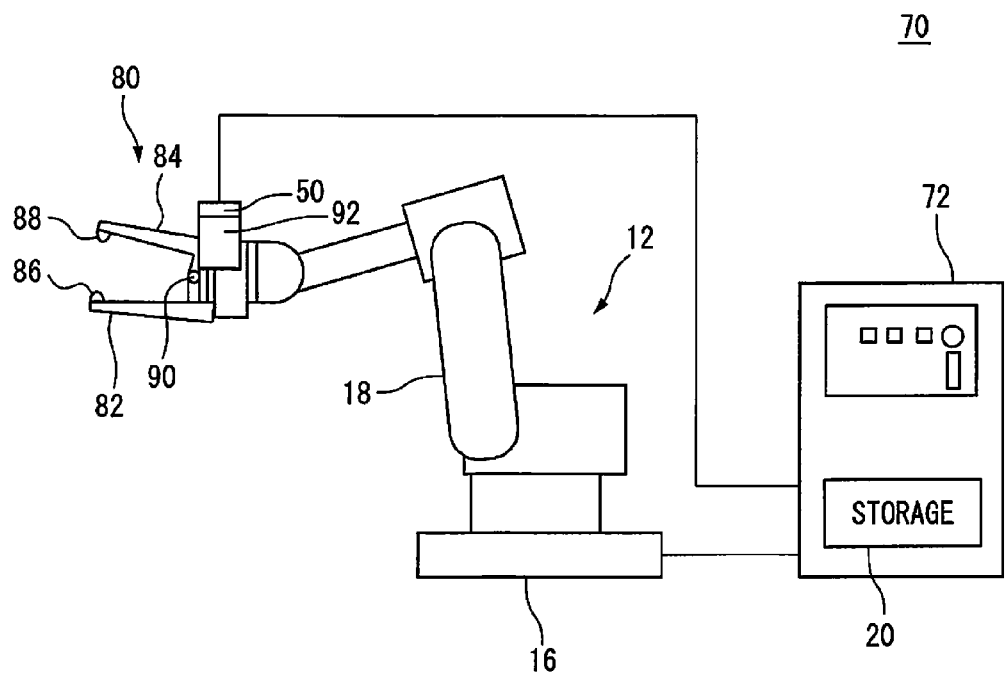
FIG. 11 is a schematic view of a spot welding system according to another embodiment of the invention.
Figure 12:
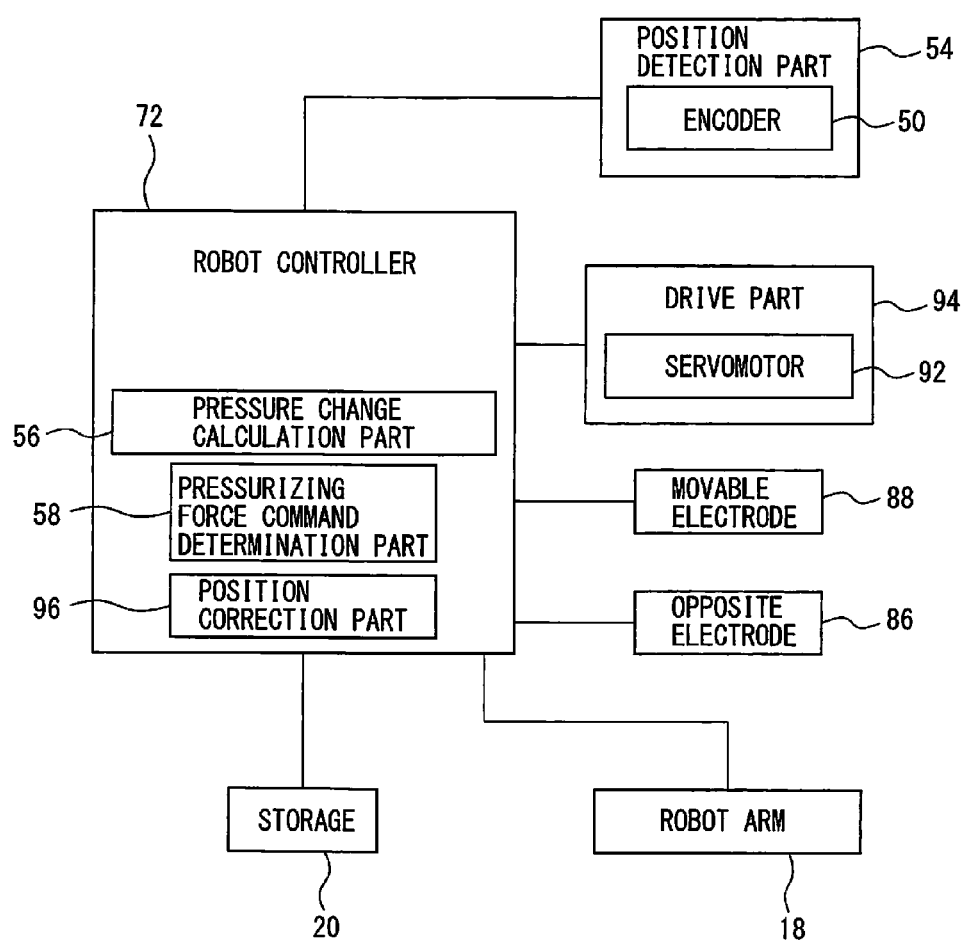
FIG. 12 is a block diagram of the spot welding system illustrated in FIG. 11.

Next, with reference to FIG. 11 and FIG. 12, a spot welding system 70 according to another embodiment of the invention will be described. Note that, in the following embodiment, elements similar to those of the above-mentioned embodiment are assigned the same reference numerals, and detailed descriptions thereof will be omitted.

The spot welding system 70 includes the robot 12, a robot controller 72, and a spot welding gun 80. The robot controller 72 directly or indirectly controls each element of the robot 12 and the spot welding gun 80. The robot controller 72 includes the storage 20 therein.

The spot welding gun 80 according to this embodiment is an X-type spot welding gun, and includes a pair of openable gun arm 82 (a first arm) and gun arm 84 (a second arm), an opposite electrode 86 mounted at a distal end of the gun arm 82, a movable electrode 88 mounted at a distal end of the gun arm 84, and a servomotor 92.

The gun arm 82 and the gun arm 84 are rotatably connected to each other via a pivot shaft 90. The servomotor 92 rotates each of the gun arm 82 and the gun arm 84 about the pivot shaft 90 via a cylinder (not illustrated), so as to move the opposite electrode 86 and the movable electrode 88 in directions toward and away from each other.

Thus, the servomotor 92 functions as a drive part 94 which drives the opposite electrode 86 and the movable electrode 88. The aforementioned encoder 50 is attached to the servomotor 92. The spot welding gun 80 calculates the amount of change $\delta_\theta$ in the pressurizing force at an arbitrary attitude of the spot welding gun 80 according to the operation flow illustrated in FIG. 8 or FIG. 10, similar as the above-mentioned embodiment.

Herein, in a so-called X-type spot welding gun as the spot welding gun 80 according to this embodiment, when the workpiece is pressurized by the opposite electrode 86 and the movable electrode 88, the gun arm 84 mounted with the movable electrode 88 is also elastically deformed.

In such spot welding gun 80, when the first position $D_1$ and the second position $D_2$ are measured in the aforementioned steps S3 and S6, a factor of the deformation of the gun arm 84 is also included in obtained position information.

Since the amount of change $\delta_\theta$ in the pressurizing force generated when the attitude of the spot welding gun 80 is changed correlates with the deformation of the gun arm 82 mounted with the opposite electrode 86, it is preferable to remove the deformation amount of the gun arm 84, which supports the movable electrode 88, from the acquired first position $D_1$ and second position $D_2$.

In this embodiment, in order to eliminate the influence of the deformation amount of the gun arm 84, the robot controller 72 corrects the positions $D_1$, $D_2$, and $D_{Ref}$ of the movable electrode 88 detected at the aforementioned steps S3, S6, and S12, as follow.

The robot controller 72 multiplies the positions $D_1$, $D_2$, and $D_{Ref}$ detected at steps S3, S6, and S12 by a ratio "r" ($=\epsilon1/(\epsilon1+\epsilon2)$) of a first deformation amount $\epsilon1$ of the gun arm 82 generated when the opposite electrode 86 is pressed by the movable electrode 88 with a predetermined force with respect to the sum of the first deformation amount $\epsilon1$ and a second deformation amount $\epsilon2$ of the gun arm 84 generated at this time.

The robot controller 72 calculates the amount of change $\delta_\theta$ with using the positions $D_1 \times r$, $D_2 \times r$, and $D_{Ref} \times r$ corrected as described above. Thus, the robot controller 72 functions as a position correction part 96 which corrects the positions $D_1$, $D_2$, and $D_{Ref}$. Note that, the aforementioned first deformation amount $\epsilon1$ and second deformation amount $\epsilon2$ can be experimentally obtained, and pre-recorded in the storage 20.

According to this configuration, the positions $D_1$, $D_2$, and $D_{Ref}$ can be corrected so as to be equivalent to the deformation amount of the gun arm 82 mounted with the opposite electrode 86, so it is possible to calculate the amount of change $\delta_\theta$ in the pressurizing force more accurately in a spot welding gun having a structure such as a so-called X-type gun.

Note that, the ratio "r" in this embodiment may be applied to the operation flow of the above-mentioned spot welding system 10 so that the positions $D_1$ and $D_2$ may be corrected to the positions $D_1 \times r$ and $D_2 \times r$ in order to calculate the amount of change $\delta_\theta$.

Further, in the aforementioned embodiments, a case is described where the opposite electrode 44, 86 as an object to be pressed is pressurized by the movable electrode 48, 88. However, instead of the opposite electrodes 44 and 86, any objects fixed relative to the movable electrode 48, 88 can be used as the object to be pressed.

Further, in the aforementioned embodiments, a change in the attitudes of the spot welding gun 30, 80 mounted at the articulated robot is described. However, a change in a pressurizing force for each attitude of the spot welding gun can be obtained similar as the above-mentioned embodiments, in a system where a spot welding gun is installed on e.g. a pedestal at which a mechanism for changing the attitude of the spot welding gun is provided.

Above, the invention has been described through the embodiments of the invention, but the aforementioned embodiments are not intended to limit the invention according to the scope of the appended claims. Furthermore, combinations of features described in the embodiments of the invention can also be included in the technical scope of the invention, but all the combinations of these features are not necessary in solutions of the invention. Moreover, it is apparent to those skilled in the art that various changes and improvements can be made in the aforementioned embodiments.

Furthermore, it should be noted that an execution order of each processing of an operation, a procedure, a step, a process, a stage and the like in an apparatus, a system, a program, and a method described in the claims, the specification, and the drawings is not specifically identified through the use of special "before", "prior to" and the like, and can be realized in any order as long as the output of a previous process is not used by a subsequent process. One must note that, even if an operation flow in the claims, the specification, and the drawings is described with the use of "first", "next", "then" and the like for convenience, it does not mean that the operation flow is necessarily to be implemented in that order.

The invention claimed is:

1. A spot welding system, comprising:
a spot welding gun including:
an opposite electrode,
a movable electrode movable relative to the opposite electrode, and
a drive part configured to drive the movable electrode;
a position detection part configured to detect a position of the movable electrode; and
a controller,
wherein,
based on
a first position of the movable electrode detected when the drive part is driven in accordance with a first pressurizing force command so as to pressurize an object to be pressed by the movable electrode in a state where the spot welding gun is arranged at a predetermined first attitude, a second position of the movable electrode detected when the drive part is driven in accordance with the first pressurizing force command so as to pressurize the object by the movable electrode in a state where the spot welding gun is arranged at a second attitude different from the first attitude, and the first pressurizing force command, the controller is configured to calculate an amount of change between (i) a first pressurizing force which, during calibration, is applied to the object from the movable electrode at the first attitude when the drive part is driven in accordance with the first pressurizing force command, and (ii) a second pressurizing force applied to the object from the movable electrode at the second attitude when the drive part is driven in accordance with the first pressurizing force command, wherein the controller is configured to store data including the calculated amount of change, and wherein, when welding a workpiece with the spot welding gun at an arbitrary attitude, the controller is configured to drive the drive part based on the stored data corresponding to the arbitrary attitude.

2. The spot welding system according to claim 1, wherein the drive part includes a servomotor, and the controller is configured to determine, during said calibration in advance, a correlation between the first pressurizing force and a feedback value from the servomotor when the servomotor is driven in accordance with the first pressurizing force command at the first attitude so as to pressurize the object by the movable electrode.

3. The spot welding system according to claim 1, wherein the controller is configured to calculate the amount of change by using a relationship in which a ratio of the second position to the first position is equal to a ratio of the second pressurizing force to the first pressurizing force.

4. The spot welding system according to claim 1, wherein the controller is configured to calculate the amount of change based on a third position detected when the drive part is driven in accordance with a third pressurizing force command so as to pressurize the object by the movable electrode in a state where the spot welding gun is arranged at the first attitude, and the third pressurizing force command.

5. The spot welding system according to claim 4, wherein the controller is configured to calculate the amount of change by using a relationship in which a ratio of a difference between the second position and the third position to a difference between the first position and the third position is equal to a ratio of a difference between the second pressurizing force and the third pressurizing force command to a difference between the first pressurizing force and the third pressurizing force command.

6. The spot welding system according to claim 1, wherein the spot welding gun further includes:

a first arm which supports the opposite electrode; and a second arm which supports the movable electrode and which is movable relative to the first arm, and the controller is configured to correct the position detected by the position detection part by multiplying the position by a ratio of a first deformation amount of the first arm to a sum of the first deformation amount and a second deformation amount of the second arm when the opposite electrode is pressurized by the movable electrode with a predetermined force.

7. The spot welding system according to claim 1, wherein the controller is configured to determine a second pressurizing force command for driving the drive part at the second attitude based on the calculated amount of change.

8. The spot welding system according to claim 1, wherein the controller is configured to:

control the spot welding gun to be arranged at a plurality of attitudes different from the first attitude;

calculate amounts of change between the first pressurizing force and a pressurizing force applied to the opposite electrode from the movable electrode when the drive part is driven in accordance with the first pressurizing force command, for each of the plurality of attitudes; and calculate a correlation between the attitude of the spot welding gun and the amount of change based on the plurality of calculated amounts of change.

9. The spot welding system according to claim 1, wherein the object is the opposite electrode.

10. A method of controlling a spot welding gun including an opposite electrode, a movable electrode movable relative to the opposite electrode, and a drive part for driving the movable electrode, the method comprising:

arranging the spot welding gun at a first attitude;

detecting a first position of the movable electrode when the drive part is driven in accordance with a first pressurizing force command so as to pressurize an object to be pressed by the movable electrode;

arranging the spot welding gun at a second attitude different from the first attitude;

detecting a second position of the movable electrode when the drive part is driven in accordance with the first pressurizing force command so as to pressurize the object by the movable electrode;

calculating, based on the first position, the second position, and the first pressurizing force command, an amount of change between (i) a first pressurizing force which, during calibration, is applied to the object from the movable electrode at the first attitude when the drive part is driven in accordance with the first pressurizing force command, and (ii) a second pressurizing force applied to the object from the movable electrode at the second attitude when the drive part is driven in accordance with the first pressurizing force command;

storing data including the calculated amount of change; and when welding a workpiece with the spot welding gun at an arbitrary attitude, driving the drive part based on the stored data corresponding to the arbitrary attitude.

11. The method according to claim 10, wherein the drive part includes a servomotor, and the method further comprises determining, during said calibrating in advance, a correlation between the first pressurizing force and a feedback value from the servomotor when the servomotor is driven in accordance with the first pressurizing force command so as to pressurize the object by the movable electrode at the first attitude.

12. The method according to claim 11, wherein the amount of change is calculated by using a relationship in which a ratio of the second position to the first position is equal to a ratio of the second pressurizing force to the first pressurizing force, when calculating the amount of change.

13. The method according to claim 11, further comprising:
calculating a third position when the drive part is driven in accordance with a third pressurizing force command so as to pressurize the object by the movable electrode, after detecting the first position, wherein
the amount of change is calculated based on the third position and the third pressurizing force command, when calculating the amount of change.

14. The method according to claim 13, wherein
the amount of change is calculated by using a relationship in which a ratio of a difference between the second position and the third position to a difference between the first position and the third position is equal to a ratio of a difference between the second pressurizing force and the third pressurizing force to a difference between the first pressurizing force and the third pressurizing force, when calculating the amount of change.

15. A non-transitory medium containing a computer program for causing a computer to execute a method of controlling a spot welding gun including an opposite electrode, a movable electrode movable relative to the opposite electrode, and a drive part for driving the movable electrode, the method comprising:

arranging the spot welding gun at a first attitude;
detecting a first position of the movable electrode when the drive part is driven in accordance with a first pressurizing force command so as to pressurize an object to be pressed by the movable electrode;
arranging the spot welding gun at a second attitude different from the first attitude;
detecting a second position of the movable electrode when the drive part is driven in accordance with the first pressurizing force command so as to pressurize the object by the movable electrode;
calculating, based on the first position, the second position, and the first pressurizing force command, an amount of change between (i) a first pressurizing force which, during calibration, is applied to the object from the movable electrode at the first attitude when the drive part is driven in accordance with the first pressurizing force command, and (ii) a second pressurizing force applied to the object from the movable electrode at the second attitude when the drive part is driven in accordance with the first pressurizing force command;
storing data including the calculated amount of change; and
when welding a workpiece with the spot welding gun at an arbitrary attitude, driving the drive part based on the stored data corresponding to the arbitrary attitude.

* * * * *